United States Patent
Stanger et al.

(10) Patent No.: US 6,974,852 B2
(45) Date of Patent: Dec. 13, 2005

(54) EMULSIFIER SYSTEM FOR AQUEOUS EMULSION POLYMERIZATION

(75) Inventors: Bernd Stanger, Dudenhofen (DE); Peter Keller, Hirschberg (DE); Eckehardt Wistuba, Bad Dürkheim (DE); Andree Dragon, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 8 days.

(21) Appl. No.: 10/889,018

(22) Filed: Jul. 13, 2004

(65) Prior Publication Data

US 2004/0254295 A1 Dec. 16, 2004

Related U.S. Application Data

(63) Continuation of application No. 09/355,941, filed as application No. PCT/EP98/00792 on Feb. 12, 1998, now abandoned.

(30) Foreign Application Priority Data

Feb. 14, 1997 (DE) .......................................... 197 05 753

(51) Int. Cl.⁷ .................. C08F 2/24; C09D 157/00; C04B 24/26
(52) U.S. Cl. .................. 526/210; 524/800; 526/211; 526/222; 526/910; 526/911; 526/932
(58) Field of Search .................. 524/800; 526/211, 526/210, 222, 910, 911, 932, 999

(56) References Cited

U.S. PATENT DOCUMENTS

| | | | |
|---|---|---|---|
| 3,637,563 A | * | 1/1972 | Christena .................. 523/305 |
| 4,029,624 A | | 6/1977 | Burkhard et al. |
| 4,100,339 A | | 7/1978 | Konig et al. |
| 4,269,749 A | | 5/1981 | Marriott et al. |
| 4,847,341 A | | 7/1989 | Ball et al. |
| 5,047,295 A | | 9/1991 | Dotzauer et al. |
| 5,208,282 A | | 5/1993 | Rehmer et al. |
| 5,348,993 A | | 9/1994 | Daeumer et al. |
| 6,306,460 B1 | | 10/2001 | Reck et al. |

FOREIGN PATENT DOCUMENTS

| | | |
|---|---|---|
| DE | 1 197 743 | 7/1965 |
| DE | 25 13 162 | 10/1975 |
| EP | 0 124 759 A1 | 3/1984 |
| EP | 0 458 144 A1 | 10/1991 |
| EP | 0 536 597 | 4/1993 |
| EP | 0 565 987 A2 | 5/1993 |
| EP | 0 558 980 | 9/1993 |
| FR | 1 343 230 | 2/1964 |
| GB | 1 021 887 | 3/1966 |
| WO | WO 96/33143 | 10/1996 |

OTHER PUBLICATIONS

Houben–Weyl, Methoden der organischen Chemie, vol. XIV/1, Makromolekulare Stoffe [Macromolecular substances], pp. 192–208, 1961, (with English Abstract).

Houben–Weyl, Methoden der organischen Chemie, vol. XIV/1, Makromolekulare Stoffe [Macromolecular substances], pp. 411–420, 1961, (English Abstract Only).

Data Sheet "Genapol ZRO" by Hoechst Aktiengesellschaft, Sep., 1980.

Technical Manual "VeoVa copolymer latex preparation," Shell Resins, Oct. 1983.

Polymer Paint Colour Journal, May 1996, 186 (4380), 44–48.

Lecture of Dr. Schul, BASF, on "Tag der Tenside", 1992, Leipzig/Germany.

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

An emulsifier system comprising
  a) a salt of a sulfuric monoester of a $C_9$–$C_{15}$ alcohol or of an alkoxylated $C_9$–$C_{15}$ alcohol, and
  b) an alkoxylated $C_8$–$C_{16}$ alcohol,
and the use of this emulsifier system for preparing aqueous polymer dispersions.

10 Claims, No Drawings

EMULSIFIER SYSTEM FOR AQUEOUS EMULSION POLYMERIZATION

This is a application of U.S. application Ser. No. 09/355,941, filed on Aug. 16, 1999, now abandoned which is the national stage application of PCT/EP98/00792, filed Feb. 12, 1998.

The present invention relates to a novel emulsifier system, to the use of this system as an emulsifier and dispersant for aqueous polymer dispersions, to aqueous polymer dispersions which comprise this system, to processes for their preparation, and to their use.

Aqueous polymer dispersions have found a broad application in coating materials, for example in the form of emulsion paints, latex paints and binder paints, in building protection and corrosion prevention, and in the coating of paper, textiles and carpets. Both when used as binders for pigments and/or in organic fillers, as for example in highly filled interior paints, moderately filled paints and paper coating slips, and for the modification of hydraulically setting compositions, such as cement mortars, the aqueous polymer dispersions are subject to particular requirements in respect of electrolyte stability and pigment compatibility. Further customary requirements made of aqueous polymer dispersions are shear stability, good film formation, water resistance of the resultant film, and good stability even at high solids. When the aqueous polymer dispersions are prepared by aqueous emulsion polymerization, the abovementioned properties can be influenced substantially by way of the emulsifier used and in many cases have little or no dependence on the monomer composition. Furthermore, the initial monomer emulsions used for free-radical aqueous emulsion polymerization are required to have a very low flow resistance. This quality too is generally influenced by the emulsifier used.

With the emulsifiers or emulsifier systems used to date for free-radical aqueous emulsion polymerization it is not possible to prepare dispersions which simultaneously meet the abovementioned requirements. Attempts have therefore been made in other ways to prepare dispersions having the specified set of properties.

For example, increasing the stability of dispersions by means of copolymerized hydrophilic comonomers, for example acrylic acid, methacrylic acid, etc., is known. A principal disadvantage of this technique is that, when the polymer dispersions are used for modifying hydraulically setting compositions, such comonomers retard the solidification of the compositions.

It is an object of the present invention, therefore, to find a way to provide aqueous polymer dispersions having an improved set of properties by means of free-radical emulsion polymerization, to give aqueous polymer dispersions which have good mechanical properties in terms of their shear stability and their filmability and also, in general, good storage stability. In particular, the polymer dispersions obtained in this way should avoid the disadvantages known from the prior art in the case of use for modifying hydraulically setting compositions, especially the retarded solidification.

We have found that this object is achieved if the aqueous emulsion polymerization is conducted using an emulsifier system which comprises at least one salt of a sulfuric monoester and at least one alkoxylated alcohol. We have also surprisingly found that when using this emulsifer system it is possible when preparing aqueous polymer dispersions to reduce, even to zero, the content of hydrophilic comonomers with substantially no detriment to the stability of the dispersions.

The invention therefore provides a process for preparing an aqueous polymer dispersion by free-radical emulsion polymerization of at least one ethylenically unsaturated monomer, which comprises employing an emulsifier system which itself comprises a) a salt of a sulfuric monoester of a $C_9$–$C_{15}$ alcohol or of an alkoxylated $C_9$–$C_{15}$ alcohol, and b) an alkoxylated $C_8$–$C_{16}$ alcohol.

The invention also provides this emulsifier system.

Component a)

Suitable emulsifiers a) are the alkali metal salts, for example sodium or potassium salts, or the ammonium salts, for example the salts with ammonia or organic amines such as mono-, di- or tri-$C_1$–$C_4$-alkylamines or mono-, di- or triethanolamines, of the sulfuric monoester. The alcohol component of the monoester is preferably an alkoxyated $C_9$–$C_{15}$ alcohol. Suitable such alcohols are naturally occurring and synthetic, linear or branched $C_9$–$C_{15}$ alcohols, and examples include the fatty alcohols with predominantly low levels of branching, which are obtainable, for example, by reduction of naturally occurring fatty acids; the oxo alcohols, which are obtainable by oxo synthesis and are in general more highly branched than the fatty alcohols; the primary, linear Ziegler alcohols, etc. The alcohols can be employed either individually or in the form of mixtures. As the alcohol component of the emulsifier a), particular preference is given to the use of lauryl alcohol. For alkoxylation, the alcohols are reacted in the desired stoichiometric ratio with at least one $C_2$–$C_4$-alkylene oxide, such as propylene oxide, butylene oxide and, preferably, with ethylene oxide. The mean degree of alkoxylation is in general from 1 to 35, preferably from 2 to 18 and, in particular from 2 to 8, especially 3.

In the preferred embodiment of the novel process the compound employed as component a) of the emulsifier system is the sodium salt of the sulfuric monoester of ethoxylated lauryl alcohol, in particular that having a mean degree of ethoxylation of 3.

Component b)

Suitable emulsifiers b) are-alkoxylated, preferably ethoxylated, $C_8$–$C_{16}$ alcohols. Particularly suitable alcohols are the natural and synthetic alcohols mentioned above in the case of component a). Preference is given to using a branched alcohol or a mixture of branched alcohols, isotridecanol being particularly preferred. The mean degree of alkoxylation is from 5 to 35, preferably from 5 to 10 and, in particular, from 6 to 9.

In a preferred embodiment of the novel process the compound employed as component b) of the emulsifier system is ethoxylated isotridecanol, in particular that having a mean degree of ethoxylation of about 8.

To prepare aqueous polymer dispersions it is preferred to employ an emulsifier system which is in the form of an aqueous solution.

The novel emulsifier system can be used alone or together with other emulsifiers and/or protective colloids.

The proportion of the emulsifier system among the entirety of emulsifiers and/or protective colloids employed is at least 10% by weight, preferably at least 40% by weight and, in particular, at least 50% by weight. The novel emulsifier system is preferably employed alone.

In general, the proportion by weight of the anionic emulsifier a) in the emulsifier system is at least 30% by weight, preferably at least 50% by weight, based on the overall amount of a) and b).

To prepare aqueous polymer dispersions, the emulsifier system is employed in an amount of from 0.05 to 10% by weight, preferably from 0.1 to 5% by weight, based on the amount of monomer.

In a specific embodiment of the novel process an emulsifier system is employed which additionally comprises a phenol- or naphthalenesulfonic acid-formaldehyde condensate. Examples of suitable naphthalenesulfonic acid-formaldehyde condensates are the Tamol® grades from BASF AG. The amount employed is in general is from about 0.1 to 2.0% by weight, based on the overall amount of monomers to be polymerized. These emulsifier systems are preferably suitable for preparing aqueous polymer dispersions which are used for modifying hydraulically setting compositions.

Other suitable emulsifiers are the emulsifiers that are known to the skilled worker and are commonly employed as dispersants in aqueous emulsion polymerization; they are as described, for example, in Houben-Weyl, Methoden der organischen Chemie, Volume XIV/1, Makromolekulare Stoffe [Macromolecular substances], Georg-Thieme-Verlag, Stuttgart, 1961, pp. 411 to 420. Both anionic and nonionic emulsifiers are suitable which are compatible with the novel emulsifier system.

It is preferred to employ other emulsifiers whose relative molecular weights, in contrast to protective colloids, are usually below 3500 daltons.

Additional nonionic emulsifiers that can be used are araliphatic or aliphatic nonionic emulsifiers, for example ethoxylated mono-, di- and trialkylphenols (EO units: 3 to 50, alkyl: $C_4$–$C_{10}$), ethoxylates of long-chain alcohols (EO units: 9 to 50, alkyl: $C_{17}$–$C_{36}$), and polyethylene oxide/polypropylene oxide block copolymers.

Examples of suitable additional anionic emulsifiers are alkali metal salts and ammonium salts of alkyl sulfates (alkyl: $C_8$–$C_{22}$), and of ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$–$C_{18}$). Other suitable emulsifiers are given in Houben-Weyl (loc. cit., pp. 192–208). Likewise suitable as anionic emulsifiers are bis(phenolsulfonic acid) ethers and/or their alkali metal or ammonium salts, carrying a $C_4$–$C_{24}$-alkyl on one or both aromatic rings. These compounds are widely known, for example from U.S. Pat. No. 4,269,749, and are available commercially, for example as Dowfax® 2A1 (Dow Chemical Company).

Examples of suitable protective colloids are polyvinyl alcohols and partially hydrolyzed polyvinyl acetates, polyacrylates, polyvinylpyrrolidone, cellulose and cellulose derivatives, for example methylcellulose, hydroxyethylcellulose, carboxymethylcellulose, starch and starch derivatives, for example cyanoalkyl ether starch, hydroxyalkyl ether starch and carboxymethylstarch, proteins and protein degradation products, for example gelatin and gelatin derivatives, etc. A detailed description of protective colloids is given in Houben-Weyl, loc. cit., pp. 411–420.

The monomer mixture used to prepare the polymers comprises from 50 to 100% by weight, preferably from 60 to 99.9% by weight, of at least one free-radically polymerizable ethylenically unsaturated monomer (principal monomer) and from 0 to 50% by weight, preferably from 0.1 to 40% by weight of at least one comonomer.

Suitable monomers are esters of $\alpha,\beta$-monoethylenically unsaturated $C_3$–$C_6$ mono- and dicarboxylic acids with alkanols of preferably 1 to 12 carbons, particularly preferably 1 to 8 carbons, such as esters of acrylic and/or methacrylic acid with methanol, ethanol, n-propanol, isopropanol, n-butanol, isobutanol and 2-ethylhexanol, esters of vinyl alcohol with $C_1$–$C_{20}$ monocarboxylic acids, such as vinyl formate, acetate, propionate, n-butyrate, laurate and stearate, vinylaromatic compounds, for example styrene, $\alpha$-methylstyrene, o-chlorostyrene or vinyltoluene, vinyl and vinylidene halides, for example vinyl chloride and vinylidene chloride, $\alpha,\beta$-ethylenically unsaturated nitriles, for example acrylonitrile and methacrylonitrile, $C_2$–$C_6$ monoolefins, such as ethylene and propylene, and nonaromatic hydrocarbons having 2 to 8 carbons and at least two olefinic double bonds, such as butadiene, isoprene and chloroprene and mixtures thereof.

Examples of suitable comonomers are $C_3$–$C_6$ $\alpha,\beta$-monoethylenically unsaturated mono- and dicarboxylic acids and their amides, examples being acrylic acid, methacrylic acid, maleic acid, fumaric acid, itaconic acid, acrylamide and methacrylamide, and also vinylsulfonic acid and its water-soluble salts, and N-vinylpyrrolidone. Monomers which customarily enhance the internal strength of the films formed from the ultimate aqueous polymer dispersion are in general copolymerized likewise only in minor amounts, usually from 0.5 to 10% by weight based on the overall amount of the monomers to be polymerized. Such monomers normally have an epoxy, hydroxyl, N-methylol or carbonyl group or at least two nonconjugated ethylenically unsaturated double bonds. Examples are N-alkylolamides of $C_3$–$C_{10}$ $\alpha,\beta$-monoethylenically unsaturated carboxylic acids and their esters with $C_1$–$C_4$ alcohols, among which very particular preference is given to N-methylolacrylamide and N-methylolmethacrylamide, silanized monomers, such as $\gamma$-methacryloxypropylsilane or vinyltrimethoxysilane, monomers having two vinyls, monomers having two vinylidenes, and monomers having two alkenyls. Particular suitability here is possessed by the diesters of dihydric alcohols with $\alpha,\beta$-monoethylenically unsaturated monocarboxylic acids, among which, in turn, acrylic and methacrylic acid are preferably employed. Examples of such monomers having two nonconjugated ethylenically unsaturated double bonds are alkylene glycol diacrylates and dimethacrylates, such as ethylene glycol diacrylate, 1,3-butylene glycol diacrylate, 1,4-butylene glycol diacrylate and also propylene glycol diacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate or triallyl cyanurate. Also of particular importance in this context are the $C_1$–$C_8$-hydroxyalkyl esters of acrylic and methacrylic acid, such as n-hydroxyethyl, n-hydroxypropyl or n-hydroxybutyl acrylate and methacrylate, and compounds such as diacetoneacrylamide and acetylacetoxyethyl acrylate and methacrylate.

In a preferred embodiment the free-radically polymerizable ethylenically unsaturated monomers (principal monomers) are selected from the three following classes in the preferred ratios set out above:

Class I vinylaromatic compounds, especially styrene and/or butadiene

Class II esters of acrylic and/or methacrylic acid with $C_1$–$C_{12}$-alkanols, especially methyl methacrylate, butyl acrylate and 2-ethylhexyl acrylate, and/or styrene Class III vinyl acetate, vinyl propionate and/or ethylene.

The aqueous polymer dispersions are prepared by free-radical aqueous emulsion polymerization in a customary manner. Polymerization is generally carried out at from 30 to 100° C. The polymerization medium can consist either only of water or else of mixtures of water with water-miscible liquids such as methanol for example. It is preferred to use only water. The emulsion polymerization can be conducted either as a batch process or else in the form of a feed process, including emulsion feed, monomer feed, staged and gradient procedures. Preference is generally given to the feed process, in which some or all of the polymerization mixture is included in the initial charge, heated to the polymerization temperature and initially polymerized to form a seed latex, and then the remainder of the polymerization mixture is supplied to the polymerization zone, usually by way of two or more spatially separate feedstreams, of which one or more contain the monomers in pure or emulsified form, continuously, in stages or with the superposition of a concentration gradient and with the polymerization being maintained. The initial charge and/or the monomer feed advantageously comprise small amounts of emulsifiers, in order to reduce the surface tension in the dispersion medium and thus to facilitate incorporation by stirring.

The initial monomer emulsions comprising the novel emulsifier system advantageously have a low flow resistance.

Polymerization initiators which can be used are all those compounds which under the polymerization conditions break down into free radicals, examples being peroxides, hydroperoxides, hydrogen peroxide, persulfates, azo compounds and redox catalysts. It is preferred to use water-soluble initiators. In some cases it is advantageous to use mixtures of different polymerization initiators, for example mixtures of hydrogen peroxide and sodium or potassium peroxodisulfate. Mixtures of hydrogen peroxide and sodium peroxodisulfate can be used in any desired proportion. Organic peroxides that are likewise suitable as initiators are described in EP-A-0 536 597. These polymerization initiators are employed in customary amounts, for example in amounts of from 0.01 to 5% by weight, preferably from 0.1 to 2.0% by weight, based on the monomers to be polymerized.

Other suitable initiators are redox catalysts. The redox catalysts comprise as oxidizing component at least one of the abovementioned percompounds and as reducing component, for example, ascorbic acid, glucose, sorbose, ammonium or alkali metal hydrogensulfite, sulfite, thiosulfate, hyposulfite, pyrosulfite or sulfide, metal salts, such as iron(II) ions or silver ions, or sodium hydroxymethylsulfoxylate.

In general the amount of free-radical initiator systems employed, based on the overall amount of monomers to be polymerized, is from 0.1 to 2% by weight. Particular preference is given to the use of ammonium and/or alkali metal peroxodisulfates, alone or as a constituent of combined systems, as initiators. With particular preference sodium peroxodisulfate is used.

The free-radical initiator system can either be included entirely in the initial charge of the polymerization vessel or else inserted continuously or in stages at the rate at which it is consumed in the course of the free-radical aqueous emulsion polymerization. This depends specifically, in a known manner, both on the chemical nature of the initiator system and on the temperature of polymerization. The initiator system is preferably supplied to the polymerization zone at the rate at which it is consumed.

The free-radical aqueous emulsion polymerization generally takes place under atmospheric pressure but can also be conducted under elevated or reduced pressure. Especially when using gaseous monomers, the polymerization can take place under elevated pressure. Accordingly, polymerization temperatures of above 100° C., for example up to about 130° C., are also possible.

The monomer mixture can if desired be polymerized in the presence of customary polymerization regulators, such as mercaptans, for example tert-dodecyl mercaptan. These regulators are then used in an amount of from 0.01 to 5% by weight, based on the overall amount of the mixture M.

Customary additives can also be added to the polymer dispersions in the initial charge, in one of the feedstreams or after the end of polymerization. Thus the pH of the dispersion can if desired be established by means of acids or bases, for example alkali hydroxides, carbonates, phosphates or acetates, ammonia, HCl, etc. Further suitable additives are reducing agents and bleaches, for example the alkali metal salts of hydroxymethanesulfinic acid (for example Rongalit®C from BASF AG).

Further suitable additives are pyrophosphates, such as sodium pyrophosphate, which can be added in an amount of from 0 to 2% by weight. They serve inter alia as buffers, dispersants, a salt component for regulating the particle size, and stabilizers for the dispersions.

Other suitable additives are antifoams, such as fatty alcohols with low degrees of ethoxylation, silicones etc. To formulate mortar compositions it is preferred to employ ethylene oxide-propylene oxide block copolymers and fatty acid esters thereof as antifoams.

The phenol- and naphthalenesulfonic acid-formaldehyde condensates mentioned above as an additional component of the novel emulsifier system can also be added to the dispersions, likewise, after the end of polymerization.

If desired, the polymerization can be followed by postpolymerization with addition of a second initiator, which is generally different from that used originally. Furthermore, the product obtained can be deodorized with steam. Suitable deodorization apparatus comprises the devices customary for this purpose, for example strippers, which can be operated batchwise.

The novel aqueous polymer dispersions are in general prepared with overall solids contents of from 15 to 75% by weight, preferably from 30 to 60% by weight.

The glass transition temperature of the polymers is in general in the range from −10 to +90° C., preferably in the range from 0 to 70° C.

The polymer particles obtained range from fine to coarse. The number-average polymer particle diameter lies in general within a range from 10 to 2000 nm, preferably from 50 to 1500 nm and, in particular, from 100 to 1000 nm.

The invention additionally provides the aqueous polymer dispersions that are obtainable by a process as described above. These dispersions advantageously possess good shear stability and can thus be exposed, for example, to the shear forces which act in the course of stirring as part of the preparation process, with essentially no detriment to the quality of the resulting polymer dispersions. Furthermore, the dispersions prepared using the novel emulsifier system are of good stability even at high solids. Since they generally, moreover, possess good electrolyte stability and pigment compatibility as well, they can be used for a large number of different fields of application, including, for example, their use as additives and/or binders or paper coating slips, pigmented compositions, inorganic fillers, such as kaolin, chalk, dolomite, etc., highly filled interior paints, moderately filled paints, adhesives, such as flooring and tiled adhesives, sealing compounds etc.

The aqueous polymer dispersions comprising the novel emulsifier system are particularly suitable as additives in hydraulically setting compositions, for example as an additive for modifying mortar and repairing concrete. Preference is given in this context to the use of polymer dispersions whose novel emulsifier system comprises a phenol- or naphthalenesulfonic acid-formaldehyde condensate or to which such a condensate is added after the end of polymerization. Preference is also given in this context to the use of polymer dispersions which as described above include only a small proportion of copolymerized hydrophilic comonomers. In the case of use for the modification of mineral-setting compositions the proportion of these comonomers is not more than 5% by weight, based on the overall monomer content. In particular, however, such dispersions contain no hydrophilic comonomers whatsoever, with the result that they solidify without the otherwise usual retardation. The polymer dispersions of the present invention are nevertheless of high stability and exhibit good film formation and good water resistance of the film.

The invention is illustrated in more detail by the following nonlimitative examples.

EXAMPLES

Example 1

A mixture of 99.88 kg of deionized water, 4.99 kg of a 20% strength aqueous solution of an ethoxylated isotridecanol having a mean degree of ethoxylation of about 8 and 7.45 kg of a 33.5% styrene seed (mean particle size about 25–40 mm) is charged to a reactor. It is then heated to 85° C., and 26.056 kg of feedstream I, 8.590 kg of feedstream II and 3.660 kg of feedstream III are added. Initial polymerization is carried out with heating of the initial charge to 95° C., and on reaching a temperature of 90° C. the metered addition of the remaining amounts of feedstreams I, II and III is commenced. The addition is made continuously over 4.0 hours (feedstreams I and II) or 4.5 hours (feedstream III). After the end of the last feed, postpolymerization is conducted at 95° C. for 0.75 hours. The resulting latex is transferred to a previously evacuated and batchwise-operated stripper, any remaining reduced pressure is compensated with nitrogen, the latex is heated to 80° C., and then nitrogen is injected until an excess pressure of about 0.5 bar relative to the previously established pressure is reached. Then feedstreams IV and V are added simultaneously over a period of 3 hours. Subsequently, with the addition of an appropriate amount of feedstream VI, a pH of from 8.5 to 9.5 is established and the product is deodorized with steam. Finally, feedstream VII is added and the pH is adjusted to 8.5 to 10 by adding sodium hydroxide solution.

| Feedstream I: | |
|---|---|
| 63.22 kg | of deionized water |
| 0.47 kg | of complexing agent based on ethylenediamine-tetraacetic acid as a 40% strength solution in water (Trilon ® B from BASF AG) |
| 83.23 kg | of sodium pyrophosphate as a 3% strength solution in water |
| 17.84 kg | of the sodium salt of the sulfuric monoester of ethoxylated lauryl alcohol (degree of ethoxlylation: 3) as a 28% strength solution in water. |
| 34.24 kg | of N-methylolacrylamide as a 35% strength solution in water |
| 6.49 kg | of tert-dodecyl mercaptan |
| 325.11 kg | of styrene |

| -continued | |
|---|---|
| Feedstream II: | |
| 162.30 kg | of butadiene |
| Feedstream III: | |
| 126.05 kg | of deionized water |
| 9.49 kg | of sodium persulfate |
| Feedstream IV: | |
| 12.83 kg | of deionized water |
| 2.14 kg | of tert-butyl hydroperoxide as a 70% strength solution in water |
| Feedstream V: | |
| 17.23 kg | of deionized water |
| 1.50 kg | of sodium disulfite |
| Feedstream VI: | |
| 4.00 kg | of deionized water |
| 5.99 kg | of sodium hydroxide as a 25% strength aqueous solution |
| Feedstream VII: | |
| 39.95 kg | of ethoxylated isotridecanol (degree of ethoxylation 8) as a 20% strength aqueous solution |
| 13.87 kg | of naphthalenesulfonic acid-formaldehyde condensate as a 45% strength solution in water (Tamol ® NN from BASF AG) |
| 1.50 kg | of antifoam based on 40 parts of propoxylated tallow fatty alcohol and 60 parts of EO/PO block copolymer stearate |

Physical Properties solids content: 50.4% pH: 9.6

Content of coagulum >180 $\mu$m: 0.002% To determine the coagulum content, 1 kg of the dispersion is filtered through a nylon mesh of known weight with an individual mesh size of 180 $\mu$m. The coagulum collected is rinsed thoroughly with distilled water and dried together with the nylon mesh. The weight of coagulum collected was measured by back-weighing and is reported in percent (based on the mass of the dispersion).

Transmission, LT value (0.01% strength in water): 42 The transmission was determined with a 0.01% strength solution in water.

Viscosity (measured with a Brookfield viscometer at 23° C., 20 rpm): 78 mPas mean particle size: 193 nm The mean particle size was determined by ultracentrifugation.

Applications Properties

The air pore content was determined in accordance with DIN 18555.

The flexural strength under tension was determined in accordance with EN 196.

The compressive strength was determined in accordance with EN 196.

The bond strength under tension was determined in accordance with DIN 18555 on a core hole.

The shrinkage in mm/m was determined in accordance with DIN 52450.

The extent of spread was determined in accordance with DIN 1060.

Example 2

Fiber-free repair mortar based on a polymer dispersion from Example 1

Wet component:

| | |
|---|---|
| 54 kg | of polymer dispersion from Example 1 |
| 83 kg | of water |
| 137 kg | |

Dry component:

| | |
|---|---|
| 185 kg | of quartz sand 0.063–0.4 mm |
| 185 kg | of quartz sand 0.15–0.6 mm |
| 185 kg | of quartz sand 0.5–1.25 mm |
| 166 kg | of quartz sand 1.5–3.0 mm |
| 273 kg | of cement CEM I 32.5 R |
| 6 kg | of microsilica |
| 1000 kg | in total |

Preparation: The dry and wet components are mixed thoroughly in the predetermined proportion.

Polymer/cement factor: 0.1

Water/cement factor: 0.4

Air pore content (%): 4.8

Extent of spread after 5 min (cm): 13

| | after 1 d | after 28 d |
|---|---|---|
| Flexural strength under tension (N/mm$^2$): | 6 | 11 |
| Compressive strength (N/mm$^2$): | 27 | 56 |
| Bond strength under tension (N/mm$^2$): core hole | | 2.6 |
| Shrinkage (mm/m) | | −0.6 |

As the applications data demonstrate, the novel polymer dispersions produce mortar compositions having good properties.

Example 3

Modified mortar based on a polymer dispersion from Example 1

Standard sand mix with cement (CEM I 32.5 R) EN 196

| | with dispersion from Example 1 | Comparison without dispersion |
|---|---|---|
| Water/cement factor | 0.5 | 0.5 |
| Polymer/cement factor | 0.1 | — |
| Extent of spread, immediate (cm) | 24 | 14 |
| Compressive strength (N/mm$^2$) | 48 | 37 |

As Example 3 demonstrates, the mortars modified with novel polymer dispersions have a markedly higher extent of spread and a likewise higher compressive strength and thus better applications properties than mortars which have not been modified.

We claim:

1. A process for preparing an aqueous polymer dispersion by free-radical emulsion polymerization of at least one ethylenically unsaturated monomer, which comprises carrying out said polymerization with an emulsifier system consisting of a) at least one salt of a sulfuric monoester of an ethoxylated lauryl alcohol, b) at least one alkoxylated branched $C_8$–$C_{16}$ alcohol, and c) a phenol- or naphthalenesulfonic acid-formaldehyde condensate.

2. The process of claim 1, wherein the emulsifier system is employed in an amount of from 0.05 to 10% by weight, based on the monomer amount.

3. The process of claim 1, wherein ethylenically unsaturated monomers are (1) selected from the group consisting of esters of α,β-unsaturated $C_3$–$C_6$ mono- and dicarboxylic acids, esters of vinyl alcohol with $C_1$–$C_{20}$ monocarboxylic acids, vinylaromatic compounds, vinyl halides, vinylidene halides, α,β-ethylenically unsaturated nitriles, $C_2$–$C_6$ monoolefins, nonaromatic hydrocarbons having at least two olefinic double bonds and mixtures thereof, or (2) the monomers as recited in (1) together with comonomers.

4. The process of claim 3, wherein the ethylenically unsaturated monomers are selected from the group consisting of esters of acrylic, methacrylic, maleic, fumaric and itaconic acid with methanol, ethanol, n-propanol, isopropanol, n-butanol, isobutanol and 2-ethylhexanol, vinyl formate, vinyl acetate, vinyl propionate, vinyl-n-butyrate, vinyl laurate, vinyl stearate, styrene, α-methylstyrene, o-chlorostyrene, vinyl toluolenes, vinyl chloride, vinylidene chloride, acrylonitrile, methacrylonitrile, ethylene, propylene, 1,3-butadiene, isoprene, chloroprene and mixtures, thereof.

5. The process of claim 1, wherein said at least one alkoxylated $C_8$–$C_{16}$ alcohol has a mean degree of alkoxylation of from 5 to 35.

6. The process of claim 1, wherein said at least one alkoxylated $C_8$–$C_{16}$ alcohol has a mean degree of alkoxylation of from 5 to 10.

7. The process of claim 1, wherein said at least one alkoxylated $C_8$–$C_{16}$ alcohol has a mean degree of alkoxylation of from 6 to 9.

8. The process of claim 1, wherein the emulsifier system is present in an amount of from 0.5 to 3.85% by weight based on the amount of monomer.

9. The process of claim 1, wherein the alkoxylated branched $C_8$–$C_{16}$ alcohol is an aliphatic alcohol.

10. The process of claim 1, wherein the $C_8$–$C_{16}$ alcohol of b) is tridecanol.

* * * * *